July 22, 1952
A. N. TRASK
2,603,893
DRAG LINE EXCAVATOR
Filed Dec. 9, 1948
6 Sheets-Sheet 1
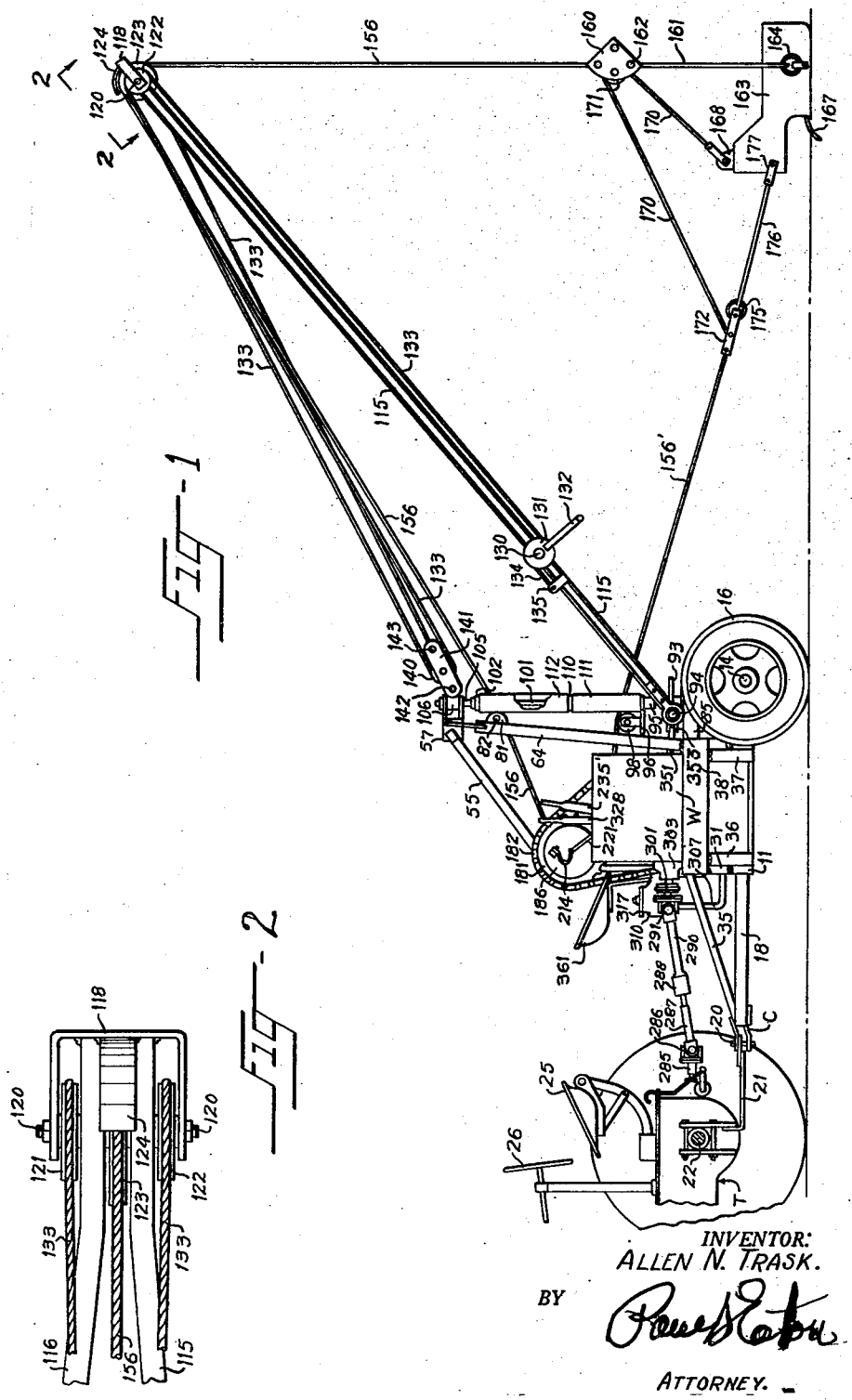
INVENTOR:
ALLEN N. TRASK.
BY
ATTORNEY.

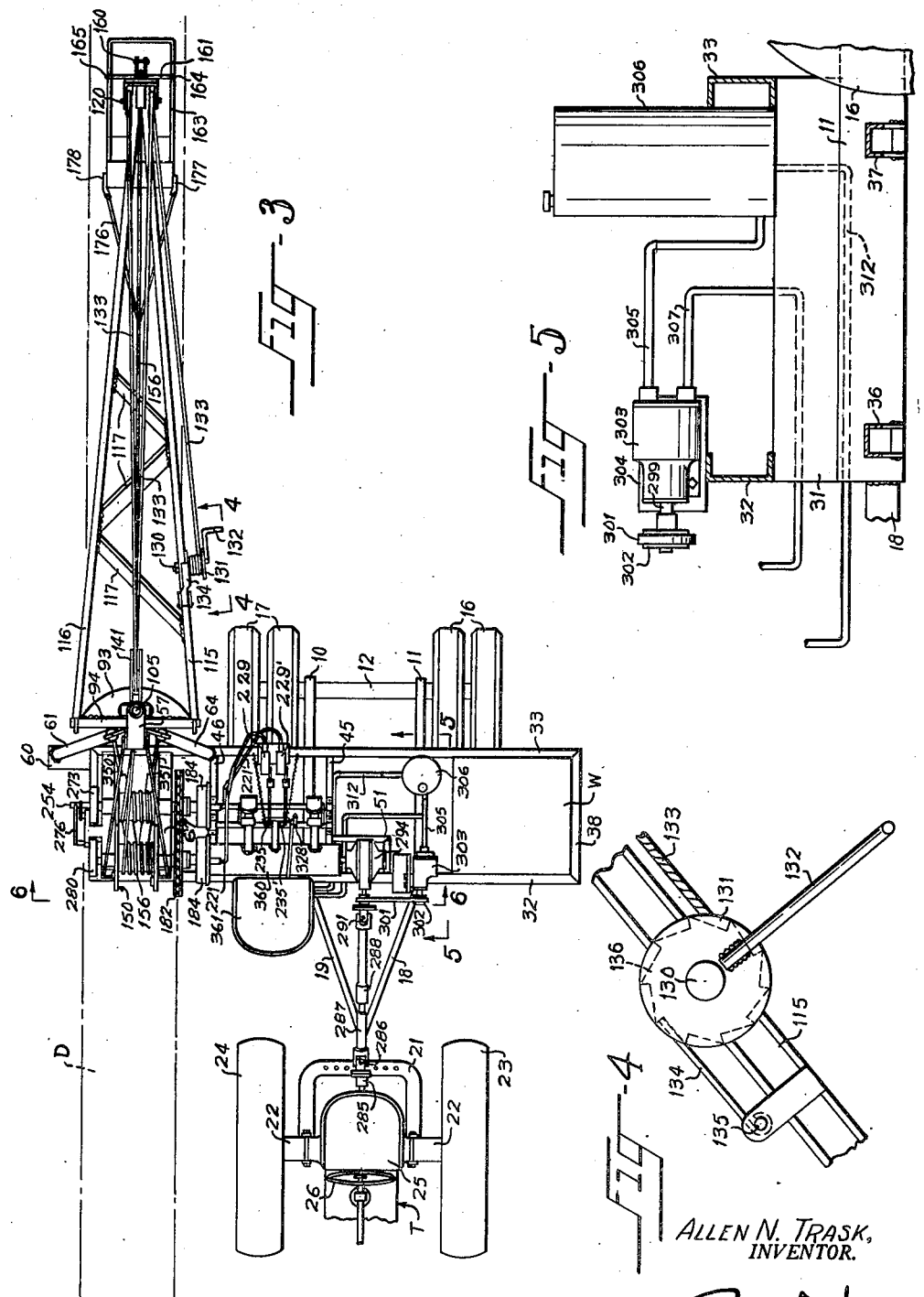

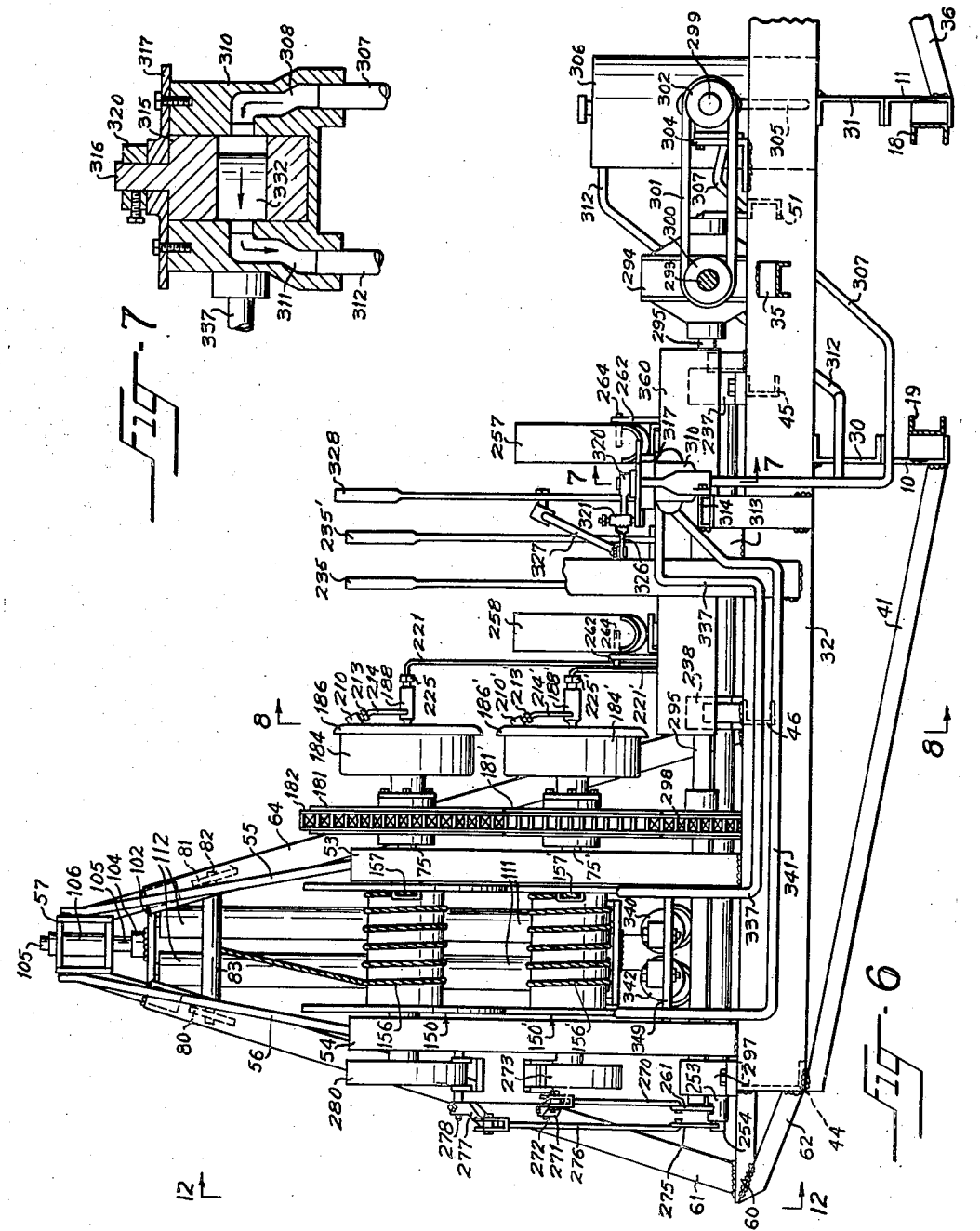

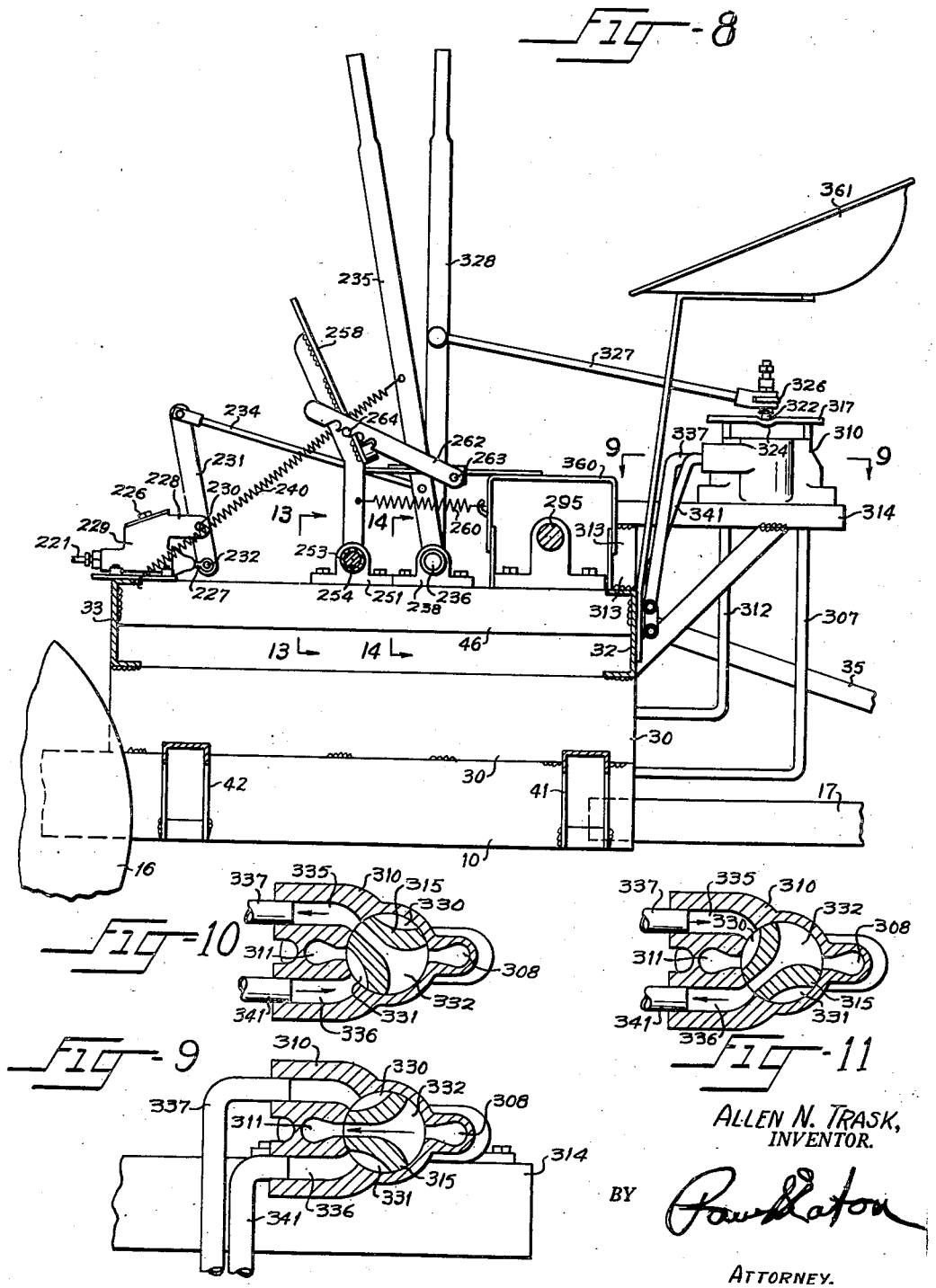

July 22, 1952
A. N. TRASK
2,603,893
DRAG LINE EXCAVATOR
Filed Dec. 9, 1948
6 Sheets-Sheet 5
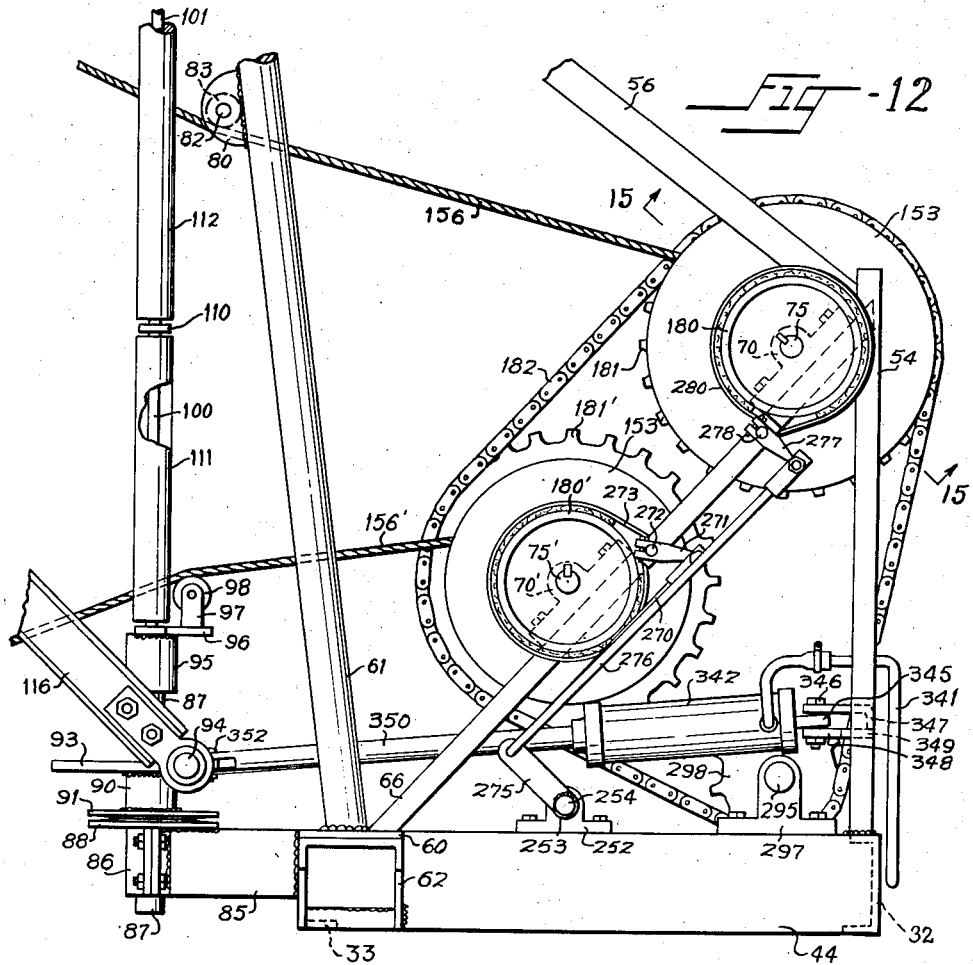
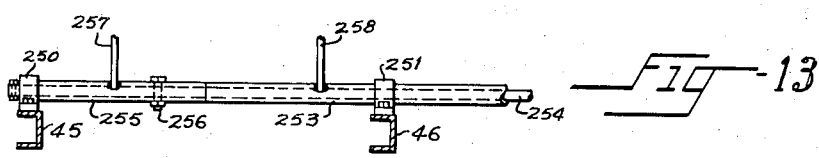
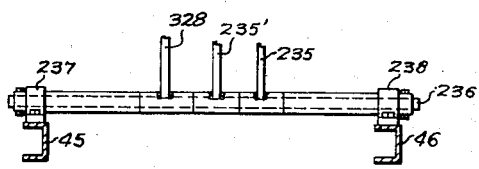
ALLEN N. TRASK,
INVENTOR.
BY
ATTORNEY.

July 22, 1952  A. N. TRASK  2,603,893
DRAG LINE EXCAVATOR
Filed Dec. 9, 1948  6 Sheets-Sheet 6
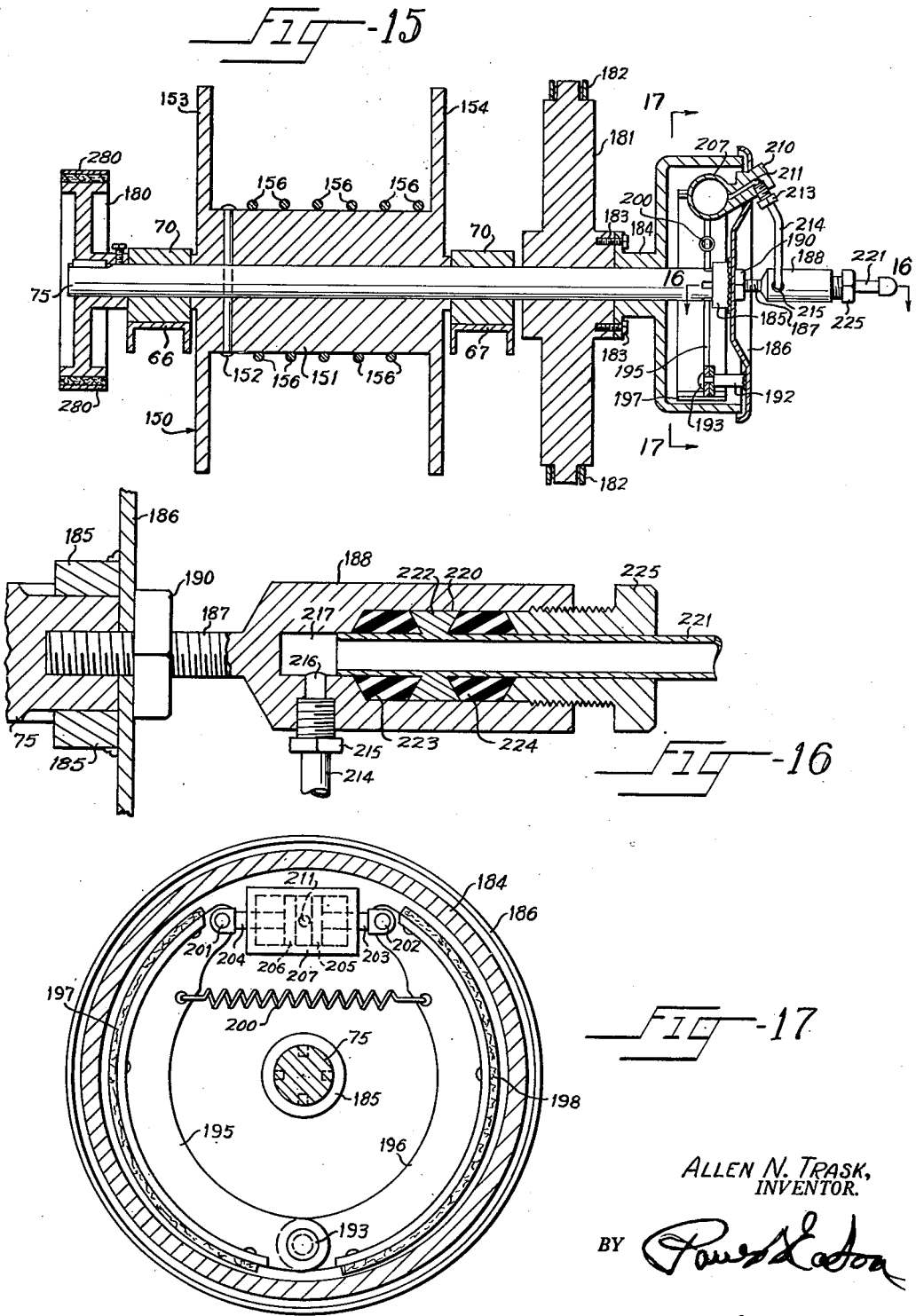
ALLEN N. TRASK,
INVENTOR.
BY 
ATTORNEY.

Patented July 22, 1952

2,603,893

UNITED STATES PATENT OFFICE 2,603,893

DRAG LINE EXCAVATOR

Allen N. Trask, Myrtle Beach, S. C.

Application December 9, 1948, Serial No. 64,415

5 Claims. (Cl. 37—116)

This invention relates to improvements in excavating machines of the type which is adapted to excavate or hoist, deliver and dump material from a distance remote from the excavating machine and containing mechanism for operating the excavator.

The further object of this invention is to provide in connection with an excavating mechanism a scoop or drag pan so arranged and controlled by suitable cables that the scoop may be mechanically operated and moved to a position remote from the main excavating machine and to one side thereof. The excavating boom is mounted on one side thereof so that the machine, the framework of which is supported by suitable wheels, may be driven along one side of a ditch and the excavating boom with the scoop thereon may extend rearwardly in a line which is parallel to the longitudinal center of the framework of the machine and whereby the scoop or drag pan can be let down into a ditch, brought forwardly in alinement with the ditch, and then raised upwardly and swung laterally of the ditch, to thereby permit a ditch to be dug or an old ditch to be cleaned out without having the banks sloping on each side thereof which is necessary where the boom carrying the scoop or drag pan is located centrally of the machine as in the case where a drag line mechanism is mounted on a machine having its own tractive power. By providing an excavating mechanism disposed at one side of the excavating machine, it is possible to hook the machine to a suitable tractor and pull the machine along one bank of a ditch and clean the ditch by letting the scoop down into the ditch and pulling it lengthwise in the ditch and then raising the scoop upwardly and then swinging it laterally to dump the contents of the scoop on the side of the ditch. Likewise the device is equally applicable to the digging of a new ditch whereby the ditch can be dug with parallel vertical side walls due to the manner in which the excavating machine is mounted on one side of the wheeled framework so as to extend laterally therefrom out over the space where the ditch is to be dug.

It is another object of this invention to provide a drag line excavator mounted on a trailer and at an extreme side edge thereof so that the trailer can be pulled along over the ground and the excavator can work in a straight line parallel to the line of travel of the mechanism to excavate a ditch having vertical side walls or to clean out an old ditch without marring the side walls thereof.

Some of the objects of the invention having been stated, other objects will appear as the description proceeds, when taken in connection with the accompanying drawings, in which—

Figure 1 is a side elevation of the excavating machine showing it attached to a conventional tractor;

Figure 2 is a plan view, on an enlarged scale, taken along the line 2—2 in Figure 1;

Figure 3 is a top plan view looking down on top of Figure 1;

Figure 4 is an enlarged detail of the mechanism for regulating the elevation of the excavating boom, taken along line 4—4 in Figure 3;

Figure 5 is a vertical sectional view, mostly in elevation, and taken along the line 5—5 in Figure 3;

Figure 6 is a rear elevation, with parts in section, and taken along the line 6—6 in Figure 3;

Figure 7 is a vertical sectional view taken along the line 7—7 in Figure 6 of the fluid control valve mechanism;

Figure 8 is a vertical sectional view taken along the line 8—8 in Figure 6;

Figure 9 is a sectional plan view taken along the line 9—9 in Figure 8 through the fluid control valve;

Figure 10 is a sectional plan view similar to Figure 9 but showing the valve core in a different position;

Figure 11 is a sectional plan view similar to Figure 9 but showing the valve core in still another position;

Figure 12 is an elevation looking at the left-hand end of the apparatus and being taken along the line 12—12 in Figure 6;

Figure 13 is a detail, partly in section, and taken along the line 13—13 in Figure 8;

Figure 14 is a detail, mostly in elevation, and taken along the line 14—14 in Figure 8;

Figure 15 is a vertical sectional view through one of the windlasses and associated parts and taken along the line 15—15 in Figure 12;

Figure 16 is a longitudinal sectional plan view taken along the line 16—16 in Figure 15;

Figure 17 is a vertical sectional view taken along the line 17—17 in Figure 15.

Referring more specifically to the drawings, the numerals 10 and 11 (Figures 3 and 6) represents a pair of channel irons to which an axle housing 12 is secured by any suitable means such as welding, and this axle housing rotatably confines an axle 14 (Figure 1) which has wheels 16 and 17 fixedly secured on its ends in a conventional manner. The channel bars 10 and 11 project forwardly and have welded to the front ends thereof the rear ends of channel members 18 and 19 (Figures 1, 3 and 6) which converge forwardly and are joined together at their front ends and to which is suitably secured clevis C which has a pair of vertically disposed coinciding holes therethrough into which a pin 20 is adapted to be releasably dropped to also pass through a hole in the rear end of a draw bar 21 secured to the axle assembly 22 of a suitable tractor T having traction wheels 23 and 24 thereon (Figures 1 and 3). The tractor is conventional and has a conventional seat 25 and a steering wheel 26.

Mounted on top of the channel members 10 and 11 are similar channel bars 30 and 31, respectively, which are secured to the top of the channel bars 10 and 11 by any suitable means such as welding (Figure 6). Welded to the top surfaces of the channel bars 30 and 31 are main frame bars 32 and 33, and welded to the front surface of main frame bar 32 is a downwardly and forwardly directed channel bar 35 which is also welded at its front end to the junction point of the channel bars 18 and 19 (Figures 3, 5, 6 and 8).

Welded to the exterior lower surface of channel bar 11 are struts 36 and 37 (Figure 1) which project outwardly and upwardly and their outer ends are suitably secured to the lower surfaces of a transverse channel bar 38 welded to the end main frame bars 32 and 33. Welded to and projecting from the outside surface of channel member 10 are struts 41 and 42 which project outwardly and upwardly and have their outer ends suitably secured to an end channel bar 44 which bridges the distance between the main frame bars 32 and 33. Suitable intermediate channel bars 45 and 46 are welded between the main frame bars 32 and 33. There is also provided a suitable channel bar 51 (Figure 3) which is L-shaped and which has one end secured to the front channel bar 32 and has the end of its longer leg secured to channel bar 45, to thus complete the main portion of the framework of the trailer on which my excavating mechanism is mounted.

Welded to the upper surface of channel bar 32 as seen in Figures 6 and 12 are upright channel bars 53 and 54 which project upwardly and have secured to their upper ends angle bars 55 and 56 which project rearwardly and upwardly and have their rear upper ends welded to a rectangular hollow block 57 (Figures 1, 3 and 6). The channel bar 44 has welded thereto and projecting outwardly therefrom a short length of channel bar 60 (Figure 6) and to the upper surface of channel bar 60 is welded the lower end of a pipe 61 which projects upwardly and is welded to the rectangular hollow member 57. This short channel bar 60 is suitably braced by a brace 62 extending between the channel bar 44 and the outer end of the channel member 60. To the upper surface of the frame bar 33 (Figures 1 and 3) is welded a pipe 64 which projects upwardly and converges inwardly toward the upper end of pipe 61 and is also welded at its upper end to the rectangular block 57.

Bridging the distance between the frame member 33 and the upper end of channel bar 54 is a brace bar 66, and also bridging the distance between the frame member 33 and the upright channel bar 53 is a corresponding brace bar 67 (Figure 3). These brace bars 66 and 67 have mounted on the upper surfaces thereof two sets of suitable alined bearing blocks 70 and 70' in which shafts 75 and 75', respectively are mounted for supporting the windlass structure which will be later described. The structure mounted on these shafts 75 and 75' is identical and only one of the same will be later described.

Welded to the pipes 61 and 64 are bearing blocks 80 and 81, respectively (Figure 6), in which a shaft 82 is mounted and on which a pipe or roller 83 is rotatably mounted against which one of the cables, to be later described and which runs to the upper windlass mechanism, is adapted to rest. The parts 53 to 83, inclusive, form an upright frame.

Welded to the rear surface of frame member 33 is a bearing block 85 (Figure 12) on the outer end of which is a bearing 86 in which the lower end of a shaft 87 is mounted for oscillation. On top of the bearing block 85 is welded a bearing plate 88 having a hole therethrough for oscillatably receiving the shaft 87, and welded to the shaft 87 is a sleeve 90 having a bearing plate 91 welded to its lower end and adapted to rest on the bearing plate 88. The sleeve 90 is secured on the shaft 87 and has a plate 93 welded to the upper end thereof which plate also has an opening therethrough through which the shaft 87 extends. This plate 93 has welded to the front edge thereof a shaft 94 (Figures 3 and 12) for supporting the boom to be presently described. The shaft 87 projects upwardly above the bearing plate 93 and has a collar 95 welded to the upper end thereof and to the upper end of the collar 95 is welded a plate 96, having a forwardly projecting portion on which is mounted a pair of uprights 97, between which is rotatably mounted a roller 98 for guiding a suitable cable, to be presently described.

Secured to the plate 96 are a pair of spaced shafts 100 and 101 (Figures 1, 6 and 12) the upper ends of which are fixedly secured to a bar 102, and to said bar 102 is welded a collar 104 to which is secured a shaft 105 which projects upwardly and rotatably penetrates a collar 106 in the rectangular block 57. A fixed plate 110 spans the distance between the shafts 100 and 101 intermediate the ends thereof. Rotatably mounted on each of shafts 100 and 101, and separated by the plate 110, are upper and lower rollers 112 and 111, respectively, the rollers on each of the shafts 100 and 101 bearing like reference characters. The hoisting cables for the drag pan pass between these rollers, and will be later described. The parts 87 to 112, inclusive, form an oscillatable frame.

Oscillatably mounted on the end of shaft 94, which is secured to the front edge of plate 93, as is shown in Figures 3 and 12, are the front ends of channel bars 115 and 116 which form the framework of a boom which are braced to each other by suitable diagonal braces 117 disposed therebetween. These channel bars 115 and 116 project rearwardly and converge toward each other and have their rear ends disposed in parallel relation to each other and are welded to a U-shaped bar 118 (Figure 2). Penetrating the rear ends of the channel bars 115 and 116 as well as the legs of U-shaped bar 118 is a shaft 120 and disposed between the left-hand leg or the upper leg of the U-shaped bar 118 in Figure 2 and channel bar 116 is a pulley 121 which is rotatably mounted on the shaft 120, and on which a cable, to be presently described, is adapted to be placed.

Also between channel bar 115 and the other leg of U-shaped bar 118 is disposed another pulley 122 for receiving a cable to be later described.

Disposed between the channel bars 115 and 116 and rotatably mounted on the shaft 120 is a third pulley 123 around which another cable, to be later described, is adapted to be mounted. A suitable curved guide bar 124 is secured at one end to the face of the U-shaped bar 118 and projecting forwardly and upwardly and arcuately over the pulley 123 to serve as a guide for the cable mounted thereon.

Mounted on the channel bar 115 is a suitable shoulder bolt 130 (Figures 1, 3 and 4) which projects outwardly of the channel bar 115 and has rotatably mounted thereon a windlass 131 having a crank 132 integral therewith and to one end of which is fixed a cable 133. A suitable dog 134 is pivoted as at 135 for engaging a ratchet wheel 136 which is integral with one of the end walls of the windlass 131 and is adapted to be placed in the position shown in Figure 4 for holding the rear end of the boom in adjusted elevated position. From windlass 131, the cable 133 passes around the pulley 122 and then extends rearwardly and passes around a pulley 140 rotatably mounted in a pulley block 141 pivotally mounted as at 142 to the member 106 forming a part of the rectangular block 57, the cable 133 then extends rearwardly and passes over the pulley 121 and returns to the pulley block 141 and has its forward end secured as to a pin 143 in said pulley block. Thus it is seen that by rotating the windlass 131 by an operator seizing the crank 132, the height of the rear end of the boom comprising members 115 and 116 may be adjusted.

The windlasses mounted on shafts 75 and 75' are identical in structure and like reference characters will be applied, with the windlass having the lowest elevation bearing prime reference characters.

The shaft 75 has a windlass, generally designated by reference character 150, mounted thereon (Figure 15) and has a drum portion 151 which is fixedly secured to the shaft 75 by any suitable means such as welding at its ends or by a pin 152 penetrating the drum 151 and the shaft 75. Integral with the ends of the drum 151 are circular head members 153 and 154.

The windlass 150 has secured thereto one end of a cable 156 by any suitable means as by securing it to the inner surface of head 154 as at 157 (Figure 6) and this cable 156 extends beneath the roller 83 and goes over the top of pulley 123 and extends downwardly and has its lower end connected to a pulley block 160 (Figure 1). Extending downwardly from the pulley block 160 is a cable 161, the intermediate portion of which is secured to the pulley block 160 as at 162 and its two downwardly extending and diverging ends are secured to the opposed sides of a drag pan 163 as at 164 and 165. This is a conventional drag pan having teeth or a scooping blade 167 and a forward portion on each side thereof having a suitable bridging member having an upstanding lug 168 to which one end of a cable 170 is connected.

The cable 170 passes over a pulley 171 mounted in the pulley block 160 and extends forwardly and has its front end connected to a pulley block 172. The pulley block 172 is connected to the rearmost end of the cable 156' extending from the windlass 150', which cable 156' on its way to windlass 150', mounted on shaft 75', passes over a roller 98 and between the lower rollers 111 while the cable 156 passes between the upper rollers 112.

The rear end of pulley block 172 is secured to the ring 175, which is slidably penetrated by a cable 176 the two ends of which extend rearwardly in diverging relation and are secured, as at 177 and 178, to the front walls of the scoop or drag pan 163.

The windlass 150 has already been described as being fixedly secured on the shaft 75 (Figure 15). This windlass has on its left-hand end, when viewed from the front of the trailer assembly, a brake wheel 180 which is fixedly secured on the shaft 75. The shaft 75 also has loosely mounted thereon a sprocket wheel 181 on which is mounted a sprocket chain 182. Secured to one side of the hub portion of the sprocket wheel 181 by any suitable means, such as bolts 183, is a brake drum 184, thus causing brake drum 184 to be freely mounted on the shaft 75.

The right-hand end of the shaft 75 in Figure 15 is splined and splined thereon is a hub member 185 having welded thereto a circular plate member 186. The right-hand end of the shaft 75 in Figure 15 has a threaded bore therein in which a threaded neck 187 of a barrel member 188 is threaded and on this threaded neck 187 is a nut 190 which, when driven home against the plate 186, confines the plate on the shaft 75.

Projecting from the inner surface of plate 186 and welded thereto is a tubular member 192 which is internally threaded at its free end for the reception of screw 193 which pivotally penetrates the lower end of brake shoes 195 and 196 having brake linings 197 and 198 secured thereon in a conventional manner. These brake shoes 195 and 196 project upwardly and are of arcuate formation and their free ends are urged towards each other by means of a tension spring 200 having its ends secured to the two brake shoes. The same upper ends of the two brake shoes have pivotally connected thereto, as at 201 and 202, piston rods 203 and 204 having on their free ends pistons 205 and 206, respectively, which are slidably mounted in a cylinder 207. Centrally of the cylinder 207 is a projection 210 which projects through and fixedly penetrates the disk 186 and has a bore 211 therethrough which communicates with the interior of the cylinder 207. Threadably mounted in the portion 210 is a hollow plug 213 which communicates with the bore 211 and the plug 213 has secured to its outer end a tube 214 which is secured by a plug 215 in the barrel member 188 and this hollow plug member communicates with a bore 216 which in turn communicates with a longitudinal bore 217 in the barrel member 188.

The entire assembly on the right-hand of the frame is broadly referred to as an excavating assembly or excavating means.

The barrel member 188 is counterbored as at 220 and a tube 221 is inserted into this counterbored portion 220 with its ends fitting in the bore 217. This tube 221 has integral therewith an enlarged portion 222 which slidably fits the bore 220 and suitable packing glands 223 and 224 are disposed around the tube 221 on each side of the enlarged portion 222 and then a packing nut 225 is threadably secured in the outer end of the counter-bored portion 220 to rotatably confine the tube 221 in the barrel 188 since the barrel 188 rotates with the windlass 150 and the shaft 75.

The tube 221 extends rearwardly and is connected to the discharge end of a suitable fluid pump 229 and having an oil reservoir portion 226 integral therewith and having a suitable piston mounted thereon, not shown, but the piston rod associated with said piston is indicated at 227 and projects from the front end of the pump assembly and the pump assembly has a lug 228 integral therewith which projects forwardly and there is pivoted as at 230 a lever 231, whose lower end is pivoted as at 232 to the piston rod 227. The upper end of lever 231 has a connecting rod 234 which projects forwardly and is connected to an intermediate portion of a lever 235, pivotally mounted on a shaft 236 mounted in suitable bearing blocks 237 and 238 (Figures 3, 6 and 14) disposed on the upper side of frame bars 45 and 46. A suitable tension spring 240 is connected to lever 235 and to the front support bar 33 for normally urging the upper end of the lever forwardly to thus normally urge the piston in pump 229 forwardly or ready for operation to discharge fluid from the pump 229 through tube 221 into the cylinder 207.

Also mounted on the shaft 236 is a similar lever 235' and another fluid pump 229' the two assemblies being identical and the tube 221' leading therefrom and going to the lower windlass assembly is identical and therefore like reference characters will apply to the two assemblies throughout.

Mounted on the frame bars 45 and 46 are bearing blocks 250 and 251, respectively (Figure 13). Also there is a bearing block 252 mounted on the end frame member 44, as will be observed in Figure 12. In the bearing blocks 251 and 252 is mounted a tube 253 inside of which is disposed a shaft 254, and shaft 254 is not only mounted in the tube 253, but extends out of its left-hand end, as is clearly visible in Figures 6 and 12, and is also mounted in bearing block 250. A tube 255 is fixedly secured on the shaft 254 by any suitable means such as a bolt 256. The sleeve or tube 255 has rising upwardly therefrom a foot pedal 257 while the tube 253 has rising upwardly therefrom a foot pedal 258. These foot pedals are normally pulled forwardly by means of tension springs 260 as shown in Figure 8. Each of the foot pedals 257 and 258 may be locked in forward position by means of a dog 262 pivoted as at 263 and having teeth in its lower forward edge adapted to engage a pin 264 extending from one side of the two foot pedals above described.

Mounted nearest the observer in Figure 12 or on the left-hand end of the tube 253 when viewed from the front of the apparatus, as is clearly shown in Figure 6, is a crank member 261. The crank 261 has connected thereto a link 270 which projects upwardly and is pivotally connected to the outer end of a crank 271 which is fixed on a shaft 272 rotatably mounted in bar 66 and this shaft 272 has a pair of oppositely directed arms, not shown, to which the two ends of a brake band 273 are connected, so that by imparting clockwise motion to the crank 271 in Figure 12 the brake band 273 will be applied to the periphery of brake wheel 180' and reverse movement will release the brake band from contact with the brake wheel 180'.

The shaft 254 projects slightly beyond the end of tube 253 and has a crank arm 275 fixedly secured thereon and the free end of the crank arm has pivotally connected thereto a connecting link 276, the other end of which is pivotally connected to a crank 277 which is fixedly secured to a shaft 278 which has oppositely directed arms, not shown, on the end thereof remote from the observer in Figure 12 to which the two ends of a brake band 280 are connected which encircles brake wheel 180 and whereby clockwise movement of shaft 278 and its arm 277 will impart a braking action to the brake band 280, whereas reverse movement will release the brake band 280 from gripping contact with the brake wheel 180.

The tractor has extending therefrom a conventional power take-off means 285 having a conventional universal joint 286 with a splined shaft 287 extending rearwardly therefrom and which is adapted to have detachably secured thereto an internally splined collar 288 which has integral therewith a shaft 290, the rear end of which is connected to a universal joint 291 which has its rear end connected to the front end of a shaft 293 extending from a differential housing 294. The rear end of the shaft 293 has a beveled gear, not shown, thereon which meshes with a beveled gear, not shown, mounted on a shaft 295 extending from the housing 294. This is a conventional automotive transmission with one of the axles removed.

The shaft 295 extends to the left in Figure 6 to approximately the left-hand side of the machine in Figure 6 and is rotatably mounted in a bearing block 297. Adjacent the bearing block 297 there is fixed on the shaft 295 a sprocket wheel 298 on which the sprocket chain 182 is mounted, said sprocket chain 182 also being mounted on the freely rotatable sprocket wheels 181 and 181' which are shown in Figure 12. The shaft 295 will thus be continuously rotated during operation of the machine as well as the sprocket wheels 181 and 181' which are freely mounted on their respective shafts 75 and 75'.

The shaft 293 has fixedly secured thereon adjacent the universal joint 291 a pulley or sprocket wheel, the same being shown in the drawing as the pulley 300, on which is mounted a V-belt 301 which belt is also mounted on a pulley 302 secured to a pump shaft 299 extending forwardly from a conventional fluid gear pump 303, which gear pump is mounted on an angle bar 304 rising from the forward frame bar 32. This gear pump has an intake pipe 305 connected thereto which leads from an expansion tank 306 and the gear pump has an output pipe 307 which extends to an intake port 308 of a valve housing 310. Said valve housing has an outlet port 311 to which a pipe 312 is connected and which pipe leads back to the top portion of expansion tank 306 as is shown in Figure 6. It is thus seen that the gear pump 303 is operated continuously while this trailer mechanism is connected to the tractor. The valve housing 310 is mounted on a support 314 welded to a block 313 rising from the frame bar 32.

The valve housing 310 has rotatably mounted therein a core member 315 having a stem 316 extending upwardly out of a valve cap housing 317. To the stem 316 is connected a lever 320 on the free end of which is mounted a barrel member 321 having a spring pressed detent 322 projecting from the lower end thereof which is adapted to engage a cavity 324 in valve cap 317 to hold the valve core in a neutral position as shown in Figure 10. The barrel member 321 has projecting from one side thereof an arm 326 which is connected to a link 327, the rear end of which is connected to a lever 328 mounted on the shaft 236 as is seen in Figure 14. The valve core 315 has arcuate cut away passageways 330 and 331 on its exterior portion and also has a passageway 332. All of these passageways are in the same plane as the intake and outtake ports 308 and 310 and the valve housing 310 has ports 335 and 336 in the same plane as the passageways 330 and 331 and 332. To port 335 is connected a pipe 337 which extends to a cylinder 340. The port 336 has a pipe 341 leading therefrom which extends to a cylinder 342. The cylinders 340 and 342 are identical and each of these cylinders 340 and 342 has a lug 345 extending from the front end thereof which is pivotally mounted by a bolt 346 loosely penetrating the same and penetrating ears 347 and 348 fixed to a bar 349 bridging the gap between the upright bars 53 and 54. The cylinders 340 and 342 have a piston mounted therein, which is not shown, and projecting from the rear end of each of the cylinders 340 and 342 is a piston rod, each of which being connected to their respective pistons within the cylinders 340 and 342 and these piston rods are designated as 350 and 351. The piston rods have their rear ends pivotally connected as at 352 and 353 to the pipe 94 secured to the front edge of plate 93.

The framework has a conventional inverted U-shaped foot rest 360 secured thereon and a conventional seat 361 is provided for the operator so that his feet can rest, when not in use, on the foot rest 360 where he can reach the pedals.

It will be noted from the drawings, and especially by reference to Figure 3, that the main frame of the apparatus projects further to the right than to the left of the draw bar in order for the boom and its mount to be disposed directly over a ditch D which is being cleaned or a new ditch which is being dug, and also that a majority of the weight of the apparatus, namely the windlasses, the boom, the weight imposed on the frame by lifting the scoop full of earth, causes the right-hand side of the framework to have very much more weight thereon than the left side, so in order to counteract this weight on the left-hand side of the main frame, I mount a suitable weight member W which may be a solid metal weight or a suitable tank which can be filled with water or other suitable liquid to an amount sufficient to cause both ends of the frame to have approximately the same weight thereon.

*Method of operation*

Let us assume that a ditch D is to be cleaned out, or that a new ditch is to be excavated. The tractor will be backed up to the front end of the apparatus and the splined sleeve portion 288 will be fitted over the splined shaft 287 and thus the power take-off of the tractor will be connected to the drive shaft 293. The clevis C will be connected to the tractor draw bar. Through the belt 301, the liquid pump 302 will be operated to force fluid continuously through pipe 307 and through the valve housing 310 and by manipulation of the levers or the lever 328, the valve core 315 can be set to any one of three positions. When set in the position shown in Figure 9, the fluid will pass through the valve housing and back to the expansion tank 306 but will at all times be under pressure to be used on call for moving the boom to the right or to the left. With the valve core 315 set in the position shown in Figure 10, the fluid under pressure will be forced through the pipe 337 into the base portion of cylinder 340 which will force its associated piston rearwardly along with its piston rod which will rotate the table 93 in a counterclockwise manner looking down on the same in Figure 3 and this will move the boom laterally to where the contents of the drag pan can be discharged on the right-hand side of the ditch or the far side of the ditch as viewed in Figure 3. Now, if it should be desired to dump the contents of the scoop 163 on the side of the ditch nearest the observer in Figure 3, then of course the valve core 315 will be moved to the position shown in Figure 11, which will cause the fluid under pressure to be forced through port 336 and through pipe 341 into the base of cylinder 342 which will force its piston outwardly to the left in Figure 12 along with its piston rod 350 which will rotate the table and boom associated therewith in a clockwise manner to swing the free end of the boom toward the observer in Figure 3 to where the contents can be dumped.

Now, for raising, lowering, and operating the scoop 163 the following procedure is carried out:

Let us assume that the scoop or drag pan 163 has been dumped and is in elevated position and it is desired to lower the same to excavating position and to operate it to excavate. The foot pedal 257 will be moved forwardly enough to permit the notched dog member 262 to be raised upwardly which will allow its associated tension spring 260 to move it in a clockwise manner in Figure 8. This will move the crank member 277 in Figure 12 in a counterclockwise manner to release the grip of the brake band on the brake wheel 180 and this will allow the weight of the scoop 163 to unwind the cable 156 from its associated windlass 150 until the scoop is resting on the earth to be excavated. Preferably the back end of the scoop might not be allowed to rest completely on the earth so as to give it a forward incline to cause its blade or teeth 167 to dig into the earth. In this event lever 235' will be seized by the operator and moved forwardly towards the operator in seat 361 by one hand of the operator, which will cause the piston in pump 229' to move rearwardly which will force the fluid therein through its associated pipe 221' into the barrel member 188' associated with the lower windlass and this will expand the brake mechanism, clearly shown in Figure 17, to cause the sprocket wheel 181' to be attached to its associated shaft 75' to thereby turn the windlass in a clockwise manner in Figure 12 to wind its associated cable 156' therearound which will move the drag pan 163 forwardly to fill the same with earth. After it has been filled with earth, the cable 156 can be let out slightly and cable 156' can continue to be wound around its associated windlass to thereby elevate the front end of the drag pan 163 to cause it to hold its contents. At that time the overall length of cables 156 and 156' can be shortened at the same time, by operating both windlasses 150 and 150' to wind their associated cables therearound until the drag pan 163 has been raised above the ground level out of the ditch, at which time the lever 328 can be moved rearwardly or forwardly to force fluid into either one of the cylinders 340 or 342 to thus partially rotate plate 93 and the boom mounted thereon until the drag pan is disposed above the ground on one side or the other of the ditch and at this time foot lever 258 can be released to allow its spring to move it forwardly of the machine which will cause slight rotation of the shaft 254 which will cause its crank 275 to rotate in a clockwise manner in Figure 12 which will release the brake bank 280 from gripping contact with its associated brake wheel 180 and this will allow the tube 253 to rotate in a clockwise manner in Figure 12 to allow its crank 261 at its upper end to move toward the observer in Figure 6 which will rotate the arm 271 in Figure 12 in a counterclockwise manner which will release the brake band 273 from gripping contact with its brake wheel 180' to thus allow the weight of the front end of the drag pan 163 to unwind the cable 156' from the lower windlass and thus allow dumping of the drag pan 163. If it is desired to facilitate dumping, the upper windlass 150 can be operated by taking up more of the cable 156 thereon at the same time the cable 156' is paid out to thus facilitate dumping of the drag pan 163, or if desired, instead of paying out any of cable 156' from the lower windlass 150', the fluid can be entered to expand the brake shoes 195 and 196 in the brake drum 184 associated with the upper windlass 150 to cause cable 156 to be wound therearound to raise the rear end of the drag pan which will also dump the contents of the same.

The various movements imparted to the drag pan are illustrated in Patent Number 1,555,906 of October 6, 1925.

In the drawings and specifications there has been set forth a preferred embodiment of the invention, and although specific terms are employed, they are used in a generic and descriptive sense only, and not for purposes of limitation, the scope of the invention being defined in the claims.

I claim:

1. Drag line apparatus comprising a wheeled frame having a cantilevered portion extending outwardly beyond the line of travel of the wheels on one side of the frame, an upright frame fixed on the cantilevered portion, the upright frame having first and second windlasses mounted therein, an oscillatable frame disposed on a vertical axis and having its lower end mounted for oscillation on the wheeled frame and having its upper end mounted for oscillation in the upright frame, a boom having its forward end mounted on a horizontal transverse axis on the oscillatable frame, a windlass mounted on an intermediate portion of the boom and having a cable extending therefrom and over the free or rear end of the boom and having its other end secured to the upper portion of the upright frame whereby the elevation of the free or rear end of the boom may be regulated, second and third cables, a drag pan, the second cable passing over the free end of the boom and having one of its ends secured to the rear end of the drag pan, and having its other end secured to the first windlass, the third cable having one of its ends secured to the lower front portion of the drag pan and having its other end secured to the second windlass and means for imparting oscillatory swinging movement to the oscillatory frame and the boom associated therewith to swing it laterally in both directions relative to the line of travel of the frame.

2. Drag line apparatus comprising a wheeled frame having a cantilevered portion extending outwardly beyond the line of travel of the wheels on one side of the frame, an upright frame fixed on the cantilevered portion of the wheeled frame, an oscillatable frame disposed on a vertical axis and having its lower end mounted for oscillation on the cantilevered portion of the wheeled frame and having its upper end mounted for oscillation in the upright frame, a boom having its forward end mounted on a horizontal transverse axis on the oscillatable frame, a windlass mounted on an intermediate portion of the boom and having a cable extending therefrom and over the free or rear end of the boom and having its other end secured to the upper portion of the upright frame whereby the elevation of the free or rear end of the boom may be regulated, a pair of windlasses mounted in the upright frame and each having one end of a cable secured thereto, the cable from one of the windlasses passing over the free end of the boom and having its free end secured to a suitable excavation apparatus such as the rear end of a drag pan, the cable on the other windlass extending rearwardly and having its free end secured to the front end of the drag pan, means for selectively rotating the windlasses to pay out or wind up the cables thereon, locking means for selectively locking the windlasses against rotation, and means for imparting oscillatory swinging movement to the oscillatory frame and the boom associated therewith to swing it laterally in both directions relative to the line of travel of the frame.

3. Drag line apparatus comprising a wheeled frame having a cantilevered portion extending outward beyond the line of travel of the wheels on one side of the frame, an upright frame fixed on the cantilevered portion of the wheeled frame, an oscillatable frame disposed on a vertical axis and having its lower end mounted for oscillation on the cantilevered portion of the wheeled frame and having its upper end mounted for oscillation in the upright frame, a boom having its forward end mounted on a horizontal transverse axis on the oscillatable frame, a windlass mounted on an intermediate portion of the boom and having a cable extending therefrom and over the free or rear end of the boom and having its other end secured to the upper portion of the upright frame whereby the elevation of the free or rear end of the boom may be regulated, and means for imparting oscillatory swinging movement to the oscillatory frame and the boom associated therewith to swing the boom laterally in both directions relative to a vertical plane parallel to but disposed outwardly of the line of travel of the wheels on the cantilevered side of the wheeled frame.

4. Excavation apparatus comprising a wheeled frame, having a cantilevered portion extending outwardly above and beyond the wheels on one side of the wheeled frame, an upright frame mounted on the cantilevered portion of the wheeled frame, an oscillatable frame mounted on a vertical axis on the cantilevered portion for swinging relative to the main frame, the lower end of the oscillatable frame being mounted for oscillation in the cantilevered portion of the wheeled frame and the upper end of the oscillatable frame being mounted for oscillation in the upright frame, a boom having its forward end secured for vertical swinging movement on the lower portion of the oscillatable frame, adjustable means mounted on the boom and extending past the free end of the boom and being connected to the upper end of the upright frame for regulating the height of the rear end of the boom relative to the ground on which the wheeled frame is resting, means for imparting lateral swinging movement to the boom in both directions relative to the line of travel of the wheeled frame, a drag pan associated with said boom, a pair of rotatable take-up means mounted in the upright frame and each having one end of a cable secured thereon, the cable from one of the take-up means extending around the free end of the boom and having its free end connected to the rear portion of the drag pan and the cable on the other take-up means extending rearwardly and having its free end secured to the lower front portion of the drag pan, means for imparting rotation to either of the take-up means as desired and means for locking the take-up means against rotation at will.

5. Excavation apparatus comprising a main frame having ground wheels on each side thereof, the main frame having one side thereof extending outwardly above the wheels on that side of the frame to a point removed a substantial distance outwardly from the line of travel of the wheels on that side of the frame, thus forming a cantilevered portion of the main frame, an upright frame mounted on the cantilevered portion and having two rotatable take-up means mounted therein, a vertically disposed oscillatable frame mounted for oscillation at its lower end on the cantilevered portion and at its upper end in the upright frame, a boom mounted on a transverse pivot on the lower portion of the oscillatable frame, said boom having pulleys in its free end, a cable having one end secured to one of the take-up means and passing around said pulleys and having its other end secured to the rear end of a suitable drag pan, said oscillatable frame having a vertically disposed guideway through which said cable may pass, and a second cable having one end secured to the other take-up means and passing through the guideway and having its other end connected to the front end of said drag pan, said boom being swingable laterally on both sides of a line parallel to but spaced outwardly from the line of travel of the wheels on the cantilevered portion of the main frame.

ALLEN N. TRASK.

REFERENCES CITED

The following references are of record in the file of this patent:

UNITED STATES PATENTS

| Number | Name | Date |
|---|---|---|
| 1,555,906 | Burke | Oct. 6, 1925 |
| 1,759,073 | Thomson | May 20, 1930 |
| 1,783,787 | Hansen | Dec. 2, 1930 |
| 1,933,472 | De Vou | Oct. 31, 1933 |
| 2,341,838 | Bager | Feb. 15, 1944 |
| 2,394,940 | Shoemaker | Feb. 12, 1946 |
| 2,442,510 | Peterson et al. | June 1, 1948 |